(12) United States Patent
Vaid et al.

(10) Patent No.: US 6,341,309 B1
(45) Date of Patent: *Jan. 22, 2002

(54) FIREWALL SYSTEM FOR QUALITY OF SERVICE MANAGEMENT

(75) Inventors: Aseem Vaid, San Jose; Sanjay Sawhney, Santa Clara, both of CA (US)

(73) Assignee: Novell, Inc., Provo, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/998,314

(22) Filed: Dec. 24, 1997

Related U.S. Application Data

(60) Provisional application No. 60/047,752, filed on May 27, 1997.

(51) Int. Cl.[7] ............................................. G06F 15/173
(52) U.S. Cl. ...................................... 709/223; 225/235
(58) Field of Search ................................ 709/223, 226, 709/245, 235, 241, 225, 233, 234; 375/225; 370/234, 254, 389, 232, 230

(56) References Cited

U.S. PATENT DOCUMENTS

| | | | |
|---|---|---|---|
| 5,109,384 A | | 4/1992 | Tseung |
| 5,193,151 A | | 3/1993 | Jain |
| 5,561,851 A | | 10/1996 | Hubbell et al. |
| 5,687,167 A | * | 11/1997 | Bertin et al. ............... 370/254 |
| 5,719,786 A | | 2/1998 | Nelson et al. |
| 5,748,629 A | * | 5/1998 | Caldara et al. ............. 370/389 |
| 5,774,668 A | * | 6/1998 | Choquier et al. ........... 709/223 |
| 5,802,106 A | * | 9/1998 | Packer ....................... 375/225 |
| 5,815,492 A | * | 9/1998 | Berthaud et al. ............ 370/234 |
| 5,815,667 A | | 9/1998 | Chien et al. |
| 5,845,267 A | * | 12/1998 | Ronen ......................... 709/245 |
| 5,884,037 A | * | 3/1999 | Aras et al. .................. 709/226 |
| 5,913,041 A | * | 6/1999 | Ramanathan et al. ....... 709/233 |
| 5,982,748 A | * | 11/1999 | Yin et al. .................... 370/232 |
| 6,038,216 A | | 3/2000 | Packer |
| 6,046,980 A | * | 4/2000 | Packer ........................ 370/230 |
| 6,047,322 A | * | 4/2000 | Vaid et al. .................. 709/224 |
| 6,078,953 A | * | 6/2000 | Vaid et al. .................. 709/203 |
| 6,119,235 A | * | 9/2000 | Vaid et al. .................. 709/235 |
| 6,137,777 A | * | 10/2000 | Vaid et al. .................. 370/230 |

OTHER PUBLICATIONS

Bolla Et. Al., "Quality of Service Management and Control of Multimedia Applications : a Scenario and Two Simple Strategies," Local Computer Networks, Proceedings of the 20th Conference, 1995, pp. 336–341.*

Liebeherr Et. Al., "A New Protocol for Bandwidth Regulation of Real–Time Traffic Classes in Internetworks," Distributed Computing Systems, Proceedings of the 15th International Conference, 1995, pp. 44–51.*

* cited by examiner

Primary Examiner—Ayaz Sheikh
Assistant Examiner—Philip B. Tran
(74) Attorney, Agent, or Firm—Cesari and McKenna, LLP

(57) ABSTRACT

A novel system for a network of computers to improve quality of services using a combination of a bandwidth mangement tool in a firewall. The present system includes, among other elements, a plurality of computers, which are each coupled to each other to form an internal network of computers (e.g., local area network or LAN). The system also includes a server, which has a memory sufficient to store a firewall program. The server is coupled to at least one of the plurality of computers, where the server is also coupled to an outgoing line to a wide area network of computers, which can be, for example, the Intenet. A bandwidth management tool is coupled to or stored in the server, where the bandwidth management tool is capable of monitoring incoming and outgoing information to and from the server.

20 Claims, 6 Drawing Sheets

SCHEMATIC OF QOS SYSTEM DEPLOYED
FOR INTERNET ACCESS AND A PRIVATE WAN

LIKELY TRAFFIC CLASSES AND POLICIES

| TRAFFIC CLASS | BASE CLASS (TRAFFIC TYPE) [ ]=APPLICATION DEPENDENT | APPLIED POLICY Y=ALWAYS N=RARELY P=POLICY/ APPLICATION DEPENDENT | | EXCEPTION CONTROL AC=ADMISSION CONTROL DP=DROP PACKETS TS=THROTTLE SOURCE LS=LOAD SHARE | | | |
|---|---|---|---|---|---|---|---|
| | | RATE | LATENCY | AC | DP | TS | LS |
| HTTP | INTERACTIVE, [ALL] | Y | P | P | N | P | P |
| HTML | INTERACTIVE | Y | P | P | N | P | P |
| GIF, JPEG | BANDWIDTH-INTENSE, [INTERACTIVE] | Y | P | P | Y | P | P |
| REALAUDIO | REAL-TIME, [INTERACTIVE] | Y | Y | Y | Y | N | Y |
| REALTIME VIDEO | BANDWIDTH-INTENSE, REAL-TIME, [INTERACTIVE] | Y | Y | Y | Y | N | Y |
| SMTP, NNTP | NONE | Y | N | N | N | N | N |
| FTP | BANDWIDTH-INTENSE, [INTERACTIVE] | Y | N | P | N | Y | P |
| TELNET | INTERACTIVE | N | Y | N | N | N | N |
| DNS | INTERACTIVE | N | Y | N | N | N | N |
| RPC | [INTERACTIVE] | P | Y | P | N | P | N |
| NOVELL NCP | [ALL] | P | P | P | P | P | P |

FIG. 4

STATE TRANSITIONS FOR TCP DATA FLOW REGULATOR

# FIREWALL SYSTEM FOR QUALITY OF SERVICE MANAGEMENT

CROSS-REFERENCE TO RELATED APPLICATIONS

This present application claims priority to U.S. Ser. No. 60/047,752 filed May 27, 1997, which is hereby incorporated by reference for all purposes.

BACKGROUND OF THE INVENTION

The present invention relates to communication or telecommunication. More particularly, the present invention provides a technique, including a method and system, for monitoring and allocating bandwidth on a telecommunication network. As merely an example, the present invention is implemented on a wide area network of computers or workstations such as the Internet. But it would be recognized that the present invention has a much broader range of applicability including local area networks, a combination of wide and local area networks and the like.

Telecommunication techniques have been around for numerous years. In the early days, people such as the American Indians communicated to each other over long distances using "smoke signals." Smoke signals were generally used to transfer visual information from one geographical location to be observed at another geographical location. Since smoke signals could only be seen over a limited range of geographical distances, they were soon replaced by a communication technique known as telegraph. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occured. People began communicating to each other by way of computers, which are coupled to the telephone lines or telephone network. These computers or workstations coupled to each other can transmit many types of information from one geographical location to another geographical location. This information can be in the form of voice, video, and data, which have been commonly termed as "multimedia." Information transmitted over the Internet or Internet "traffic" has increased dramatically in recent years. In fact, the increased traffic has caused congestion, which leads to problems in responsiveness and throughput. This congestion is similar to the congestion of automobiles on a freeway, such as those in Silicon Valley from the recent "boom" in high technology companies, including companies specializing in telecommunication. As a result, individual users, businesses, and others have been spending more time waiting for information, and less time on productive activities. For example, a typical user of the Internet may spend a great deal of time attempting to view selected sites, which are commonly referred to as "Websites," on the Internet. Additionally, information being sent from one site to another through electronic mail, which is termed "e-mail," may not reach its destination in a timely or adequate manner. In effect, quality of service or Quality of Service ("QoS") of the Internet has decreased to the point where some messages are being read at some time significantly beyond the time the messages were sent.

Quality of Service is often measured by responsiveness, including the amount of time spent waiting for images, texts, and other data to be transferred, and by throughput of data across the Internet, and the like. Other aspects may be application specific, for example, jitter, quality of playback, quality of data transferred across the Internet, and the like. Three main sources of data latency include: the lack of bandwidth at the user (or receiving) end, the general congestion of Internet, and the lack of bandwidth at the source (or sending) end.

A solution to decreasing data latency includes increasing the bandwidth of the user. This is typically accomplished by upgrading the network link, for example by upgrading a modem or network connection. For example, the network link may be upgraded to X2 modems, 56K modems, ADSL or DMT modems, ISDN service and modems, cable TV service and modems, and the like. Drawbacks to these solutions include that they typically require additional network service; they also require additional hardware and/or software, and further they require both the sender and receiver to both agree on using the same hardware and/or software. Although one user may have a much faster line or faster modem, another user may still rely on the same 1,200 kbaud modem. So, the speed at which information moves from one location to another location is often determined by the slowest information which is being transferred over the network. Accordingly, users of faster technology are basically going nowhere, or "running" nowhere fast, as is commonly stated in the network industry.

From the above, it is seen that a technique for improving the use of a wide area network is highly desirable.

SUMMARY OF THE INVENTION

The present invention relates to a technique including a method and system for providing more quality to telecommunication services. More particularly, the present invention relates to quality of service management using computer network firewalls or using a firewall system for implementing quality of service management, which can also be referred to as "bandwidth" mangement.

In a specific embodiment, the present invention provides a novel system for a network of computers to improve quality of services using a combination of a bandwidth mangement tool in a firewall. The present system includes, among other elements, a plurality of computers, which are each coupled to each other to form an internal network of computers (e.g., local area network or LAN). The system also includes a server, which has a memory sufficient to store a firewall program. The server is coupled to at least one of the plurality of computers, where the server is also coupled to an outgoing line to a wide area network of computers, which can be, for example, the Intenet. A bandwidth management tool is coupled to or stored in the server, where the bandwidth management tool is capable of monitoring incoming and outgoing information to and from the server.

In an alternative embodiment, the present invention provides an easy to use method for installing a bandwidth mangement tool into a server, which is used as a firewall for a network of computers. The network of computers can each be coupled to each other to form a local area network, but is not limited to such a local area network. The server includes, among other elements, a computer memory, which can be a hard drive, a floppy drive, a random access memory, and combinations thereof, and others. The computer memory stores the firewall program. The present method includes a step of installing a bandwidth management tool into a portion of the computer memory. Installation can occur using a variety of techniques such as transferring the tool from a removable storage device such as a floppy disk, CD ROM, removable hard disk, and the like. Alternatively, the bandwidth mangement tool can be uploaded from a site to the server using, for example, a modem. The bandwidth management tool is capable of monitoring incoming and outgoing information to and from the server to improve quality of services of the network of computers.

Numerous advantages are achieved by way of the present invention over pre-existing or conventional techniques. In a specific embodiment, the present invention provides a single point or a single region to manage telecommunication traffic including directory services and bandwidth management. Additionally, in some, if not all embodiments, the present invention can be implemented at a single point of access such as a computer terminal or firewall, for example. Furthermore, the present invention can be predominately software based and can be implemented into a pre-existing system by way of a relatively simple installation process. These and other advantages are described throughout the present specification, and more particularly below.

Further understanding of the nature and advantages of the invention may be realized by reference to the remaining portions of the specification, drawings, and attached documents

BRIEF DESCRIPTION OF THE DRAWINGS

FIG. 4 illustrates a simplified table summarizing some basic TCP/IP traffic classes and typical policies that are applied to them;

DESCRIPTION OF SPECIFIC EMBODIMENTS

An embodiment of the present invention provides integrated network service policies for firewall platforms. Specifically, the present invention provides network or firewall administrators with the ability to implement policy-based schema for security and resource management on firewall platforms. In a specific embodiment, resource management includes Network Quality of Service (QoS) or "bandwidth" management techniques.

Network QoS is managed by managing the resources that serve network application traffic, for example. This typically includes the following resources: link bandwidth, application server bandwidth (CPU) and buffer space on generally all nodes (end-points, routers and gateways). Typically, data through-put is limited by the speed of Internet access links and by the server CPU Capacity, and response time is determined by the number of hops in a route, physical length of the route, and extent of congestion in the route. There are various other factors that may affect QoS, such as the behavior of TCP/IP, severe congestion anywhere in the route, prioritization of traffic along the route, etc. To a network administrator, embodiments of the present invention provide discrimination of different traffic types and provide methods for enforcement of traffic flow by management to the above resources.

I. System Overview

Figure 1:
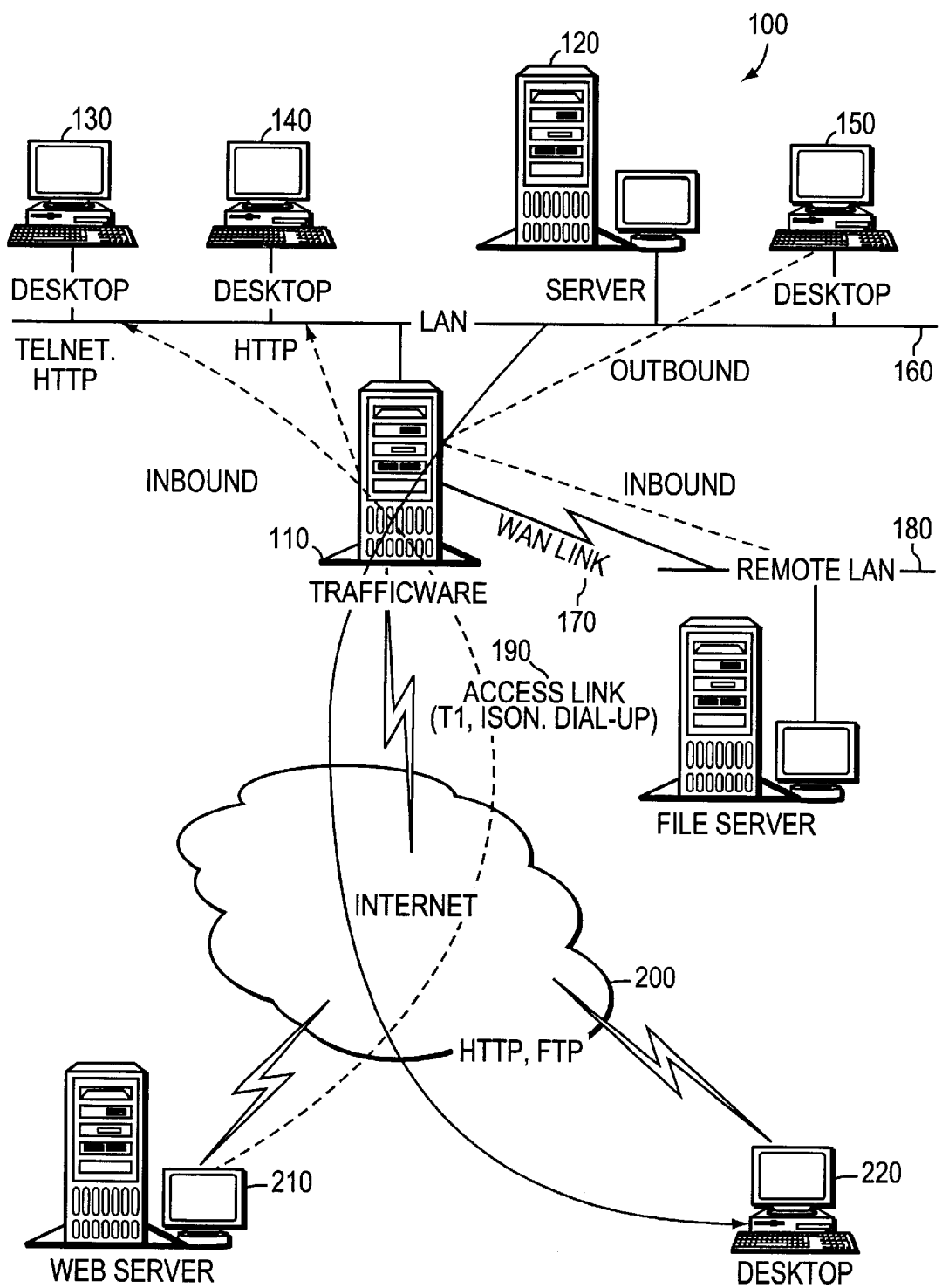
FIG. 1 illustrates a simplified system including an embodiment of the present invention.

FIG. 1 illustrates a simplified system 100 including an embodiment of the present invention. The system 100 is merely an illustration and should not limit the scope of the claims herein. One of ordinary skill in the art would recognize other variations, modifications, and alternatives. The present invention can be embodied as TrafficWare™ firewall server 110 from Ukiah Software, Inc, but can be others. System 100 typically includes a file server 120, and a plurality of computers 130–150, coupled to a local area network (LAN) 160, and other elements. Firewall server 110 includes a typical connection to a wide area network (WAN) 170 and to a remote LAN 180 (such as an Intranet) and a typical network connection 190 to the Internet 200. Attached to Internet 200 are Web servers 210 and other computers 220.

As illustrated, computers such as computer 130, 140, and 210 communicate using any one or multiple application layer protocols such as Telnet, file transfer protocol (FTP), Hypertext transmission protocol (HTTP), and the like. Further, communication across WAN 170 and across network connection 190 implements transport layer protocols such as transmission control protocol (TCP), universal data protocol (UDP), and the like. LAN 160 and LAN 180 are preferably based upon network protocols such as Internet protocol (IP), IPX from Novell, AppleTalk, and the like. As shown in FIG. 1, network connection 190 may be accomplished using T1, ISDN, Dial-up, and other hardware connections. Computers 120–150 and 210–220 may be any suitable make or model of computer that can be coupled to a network. The system can also include a variety of other elements such as bridges, routers, and the like.

Figure 2:
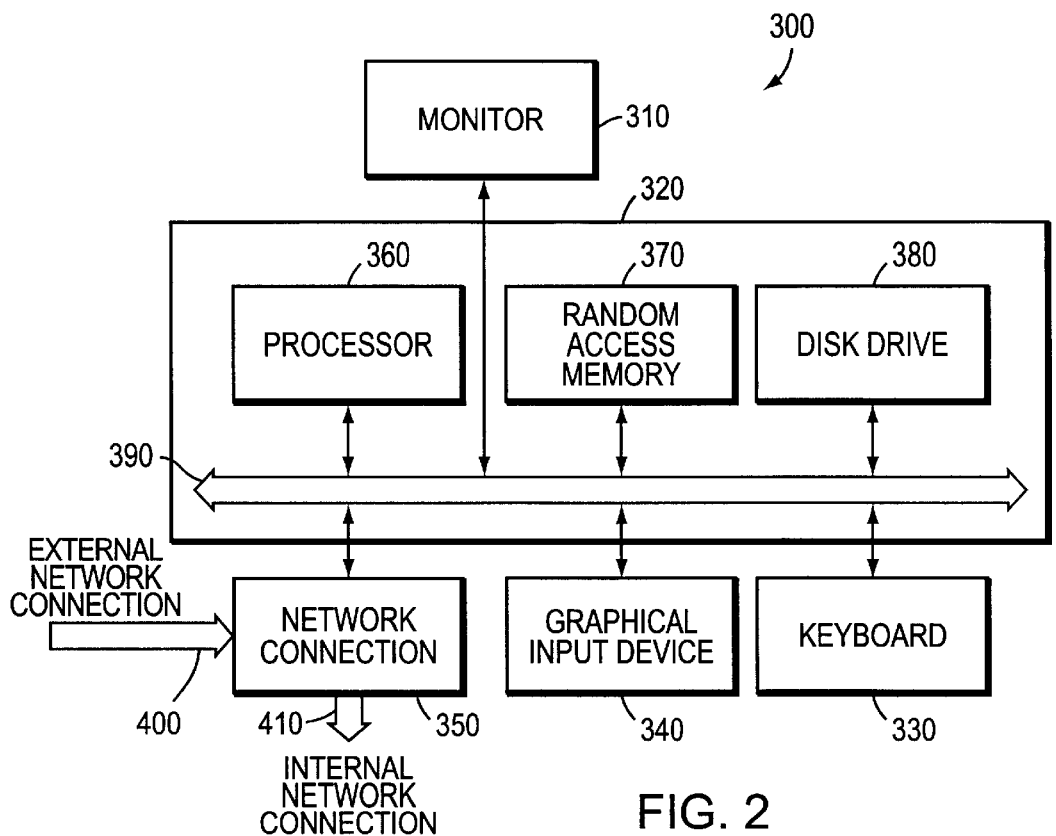
FIG. 2 is a simplified block diagram of a firewall server according to an embodiment of the present invention.

FIG. 2 is a simplified block diagram of a firewall server 300 according to an embodiment of the present invention. The block diagram is merely an illustration and should not limit the scope of the claims herein. Firewall server 300 typically includes, among other elements, a monitor 310, a computer 320, a keyboard 330, a graphical input device 340, and a network interface 350. Computer 320 includes familiar computer components such as a processor 360, and memory storage devices, such as a random access memory (RAM) 370, a disk drive 380, and a system bus 390 interconnecting the above components. A external network connection 400 and an internal network connection 410 are coupled to network interface 350.

A mouse is but one example of graphical input device 340, also known as a pointing device, a trackball is another. RAM 370 and disk drive 380 are examples of tangible media for storage of computer programs such as embodiments of the herein described invention. Other types of tangible media include floppy disks, removable hard disks, optical storage media such as CD-ROMS and bar codes, semiconductor memories such as flash memories, ASICs, read-only-memories (ROMS), battery-backed volatile memories, and the like. External network connection 400 typically provides access to external networks such as LAN 180 or Internet 200, as described in FIG. 1. Internal network connection 410 typically provides access to internal networks such as LAN 160.

In a specific embodiment, firewall server 300 includes an IBM PC compatible computer having a '586-class based microprocessor, such a Pentium™ from Intel Corporation, running WindowsNT™ from Microsoft Corporation, and TrafficWare™ software from Ukiah Software, Inc. Network interface 350 is preferably embodied as a hardware firewall server also from Ukiah Software, Inc., but can be others.

FIG. 2 is representative of but one type of system for embodying the present invention. It will be readily apparent to one of ordinary skill in the art that many system types and software configurations are suitable for use in conjunction with present invention. The present invention can be in the form of software in one embodiment. Alternatively, the present invention can be a combination of hardware and software, which can be further combined or even separated. Of course, the particular type of system used in the present invention depends highly upon the application.

II. Outbound Control

1. Traffic Classes

An embodiment of the present invention discriminates between traffic classes or traffic types. For example, between application/protocol (e.g., HTTP, SMTP, FTP, Telnet), data-type (e.g., MIME type, HTML, JPEG, RealAudio, .WAV, .MOV), source/destination identifier (e.g., IP address, user name, domain, URQ), type (real-time, interactive, throughput-intense), direction (inbound/outbound), and the like. Further traffic classes are based upon specifics user (e.g., President, Shipping Clerk), business group (e.g., Sales, Engineering, Accounting), priority (e.g., user-determined priority levels), direction (e.g., inbound, outbound, customer, guest).

Figure 3:
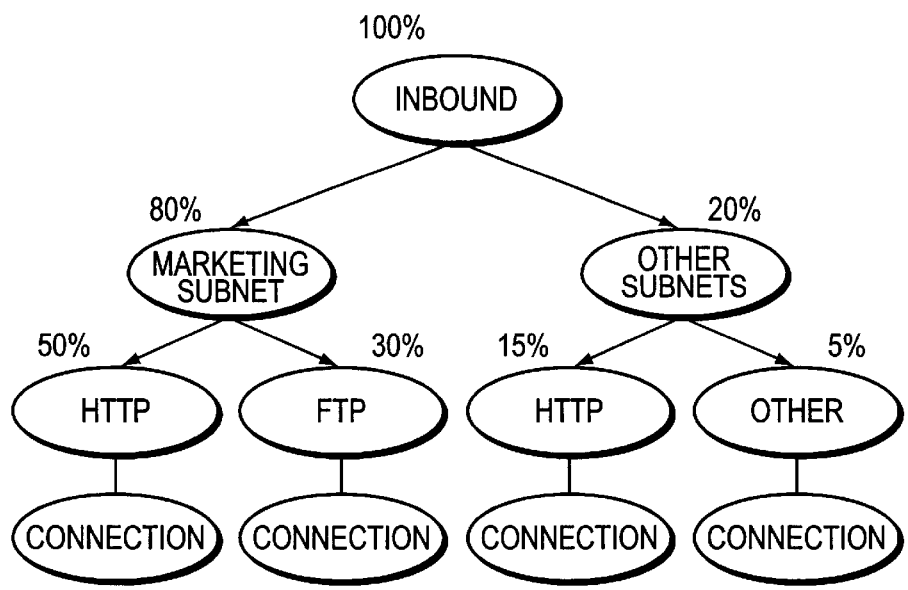
FIG. 3 illustrates an example of a simplified hierarchical model for determining bandwidth sharing.

FIG. 3 illustrates an example of a hierarchical model for determining bandwidth sharing. This model is merely an illustration and should not limit the scope of the claims herein. As illustrated in FIG. 3, a hierarchical model is represented as a tree, with the root representing the total available bandwidth, each branch node representing aggregated traffic (meta-traffic classes), and the leaves representing individual connections (traffic classes). This model gives the user flexibility in defining and implementing a service policy or multiple service policies. For example, the network traffic is first divided in different ways and then the specific policy refined from a top down approach or amalgamated from a bottom up approach. This model also provides the user with different methods for different traffic classes since it abstracts the policy definition from the enforcement or implementation.

The user typically has competing factors to consider when determining a network QoS policy, including bandwidth "guarantees", latency "guarantees", and exception control. It should be understood "guarantees" refer to best efforts of the system to provide service, and does not in any way imply an absolute guarantee of service. For example, obviously no service can be provided or guaranteed if the network connection is inoperative, if the Internet Service Provider (ISP) has hardware or software glitches, or there is a general Internet crash.

A first factor is bandwidth guarantee, or data throughput guarantee, and how excess bandwidth is shared. For traffic classes that have data intensive requirements this is an important criteria. Typically, the user initially determines what are the minimum bandwidth guarantees that are given for different traffic classes or for connections relying on data from the different traffic classes, before determining a policy. As result of the policy, the system monitors the actual bandwidth provided to different classes, and preferably if bandwidth is critically low, the system attempts to provide at least the minimum bandwidth to the different traffic classes.

Typically, the user also initially determines how excess bandwidth is allocated. In a hierarchical model, the user provides bandwidth sharing by classes 'passing up' or 'receiving' unused bandwidth via their 'parents'. As a result, closer siblings (traffic classes) typically are able to share more bandwidth than distant traffic classes. Alternatively, the user may decide that all leaf classes are allowed to utilize excess bandwidth simply based on their priority.

A second factor is latency guarantees, or response time guarantees. For traffic classes that are sensitive to delays this is an important criteria. Typically latency is determined by the end-end route rather than the local network or any single gateway. The user typically first determines what are the maximum latency guarantees that are given for different traffic classes, before determining a policy. In response to the policy, the system monitors the bandwidth provided to different classes and if a particular traffic class requires a quicker response, the system attempts to provide more bandwidth for that traffic class. This monitoring occurs preferably when the network is idle or when the network is congested.

A third factor is exception control. The system preferably implements exception control when the bandwidth link capacity is being exceeded (congestion) or when a traffic class is attempting to exceed it's allotted capacity. Initially, the user typically determines what actions to perform when there are exceptions, some actions include: admission control (e.g., deny new requests), service degradation (e.g., dropping packets), sources throttling, traffic redirection (load sharing), and the like. Exception control is preferably a function of traffic type and policy. For example, the user may determine that realtime video requires a steady bit-rate and thus requires admission control as an exception policy when the bandwidth is low, and the user may determine that bulk file download services (which are weakly interactive) may accommodate some new requests thus instruct the system to throttle the download sources when the bandwidth is low.

The user is preferably provided with three properties: bandwidth intensive, real-time and/or interactive, which are useful in describing meaningful policies for the different traffic classes. Bandwidth-intense traffic classes typically require relatively large transmission rates (>50 kbps) for each connection over short or long intervals to maintain reasonable quality. Interactive classes typically require a low latency for all packets to maintain a good response time. Real-time classes typically require a very steady rate of data delivery (high or low) and generally also low latency. These three properties or combinations of them can also be thought of as describing generic (base) classes of traffic.

FIG. 4 illustrates a table summarizing some basic TCP/IP traffic classes and typical policies that are applied to them. As show, traffic classes such as HTTP, HTML, GIF, JPEG, RealAudio, Realtime Video, SMTP, NNTP, FTP, TELNET, DNS, RPC, Novell NCP are shown. To these classes, a base class is given. Applied policy and exception control are also provided, for example. Other combinations or assignments of the above policies may be made in alternative embodiments of the present invention. Further, in FIG. 4, 'P' represents dependence upon a specific policy implemented by the user.

2. Packet Scheduling

The system allocates output bandwidth per traffic class preferably by using a class of scheduling methods referred to as fair queuing algorithms at the firewall. These algorithms model traffic as weighted flows and attempt to ensure that service is given to all flows (traffic classes) in proportion to their assigned minimum bandwidth. Service typically occurs in a round robin fashion while monitoring the maximum delays. The system preferably combines such methods with priority based schedulers in order to provide latency guarantees. These types of outbound flows systems typically apply localized control over all time intervals, are generally efficient to implement, provide good link utilization, and do not depend on protocol or connection semantics.

Outbound flow control as described above is preferably combined with TCP/IP rate control, described below.

III. Source Control

In an embodiment of the present invention, rate control policies are specified in the form of a bandwidth allocation hierarchy, as described above, that defines aggregates of traffic according to user-specified parameters (e.g., application type, MIME type or source/destination ID). Further, classes are either guaranteed or best-effort.

As described above, inbound flows may have guaranteed classes that include a minimum reserved rate per connection and preferably have limits on the total bandwidth used or number of simultaneous guaranteed connections. Preferably, the remainder of the bandwidth, including any excess from the guaranteed classes, is dynamically allocated to 'best-effort' classes, and new best-effort connections. The specific allocation and policy are user definable. In the preferred embodiment, classes that flow above their rate limits are subject to rate control preferably if there is demand from siblings, either in the form of new connection requests.

IV. TCP/IP Flow Control

Flow control behavior refers to having end-points adjust their transfer rates in response to congestion indicators or under gateway control. This applies to bath inbound and outbound traffic. In the preferred embodiment, the end-points implement TCP/IP.

TCP flow control uses the concept of "window size" to enable a receiver endpoint to indicate how much data the source end-point can send in a burst at any given time. To do this, the receiver transmits a window size limit to the source. TCP utilizes timeouts and duplicate acknowledgment signals (ACKs) to initially determine network congestion, and then utilizes the concept of window size as a tool to prevent and respond to the congestion. To do all this accurately and efficiently, TCP uses a half-dozen subtly intertwined algorithms. Congestion control is done reactively and coarsely and typically involves long delays and retransmitted traffic on the network. ACKs are used to avoid overall network collapse.

In an embodiment, a gateway at the route bottleneck (e.g., the Internet access line) is used to invoke this window size flow control mechanism in a proactive manner by screening bandwidth use and updating the sources. Typically, control applies over relatively large time scales (typical Internet round-trip times).

In alternative embodiments of the present invention, ICMP Source Quenching can also be used to serve as a flow control mechanism. ICMP Source Quenching is an IP mechanism typically invoked by routers to indicate buffer overflow. BSD based TCP/IP stacks will effect a sharp backing off of TCP data traffic bursts on receipt of such ICMP packets.

To achieve control over inbound traffic, the present invention invokes flow control at the source to spoof window size packets. This technique is also applied as a high-level control over the outbound fair scheduler in order to control congestion preferably when traffic is not subject to admission control. Further, a fair scheduler for inbound communications is used to identify which classes may need to be controlled at the source.

Figure 5:
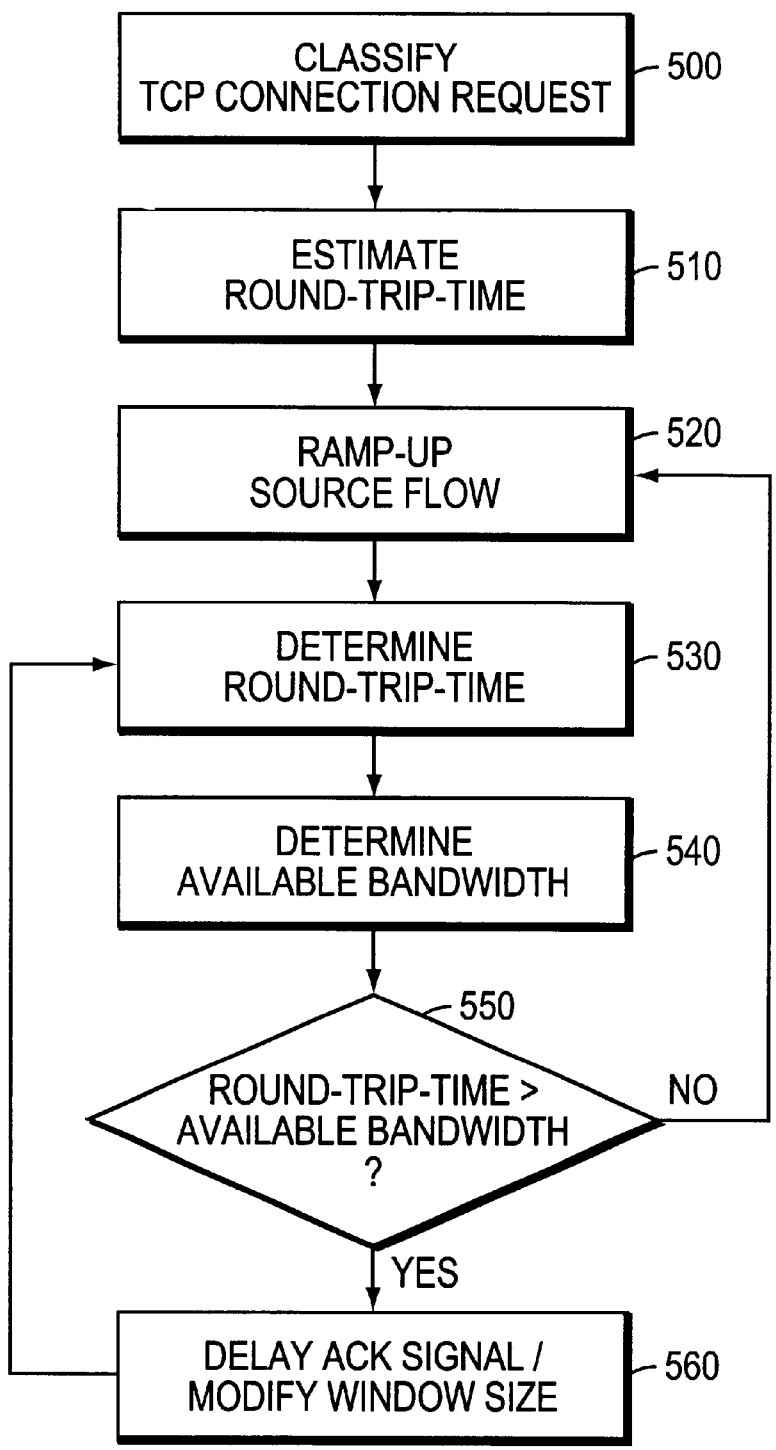
FIG. 5 illustrates a simplified block diagram of a flow chart according to an embodiment of the present invention.

FIG. 5 illustrates a simplified block diagram of a flow chart according to an embodiment of the present invention. Initially, a TCP connection request (SYN) is classified into the user-specified class hierarchy, step 500. A connection is fully classified if it can be assigned to a leaf node. The connection is partially classified if it cannot be uniquely assigned to a non-leaf node. A connection may not be fully classified until the arrival of the first request-data packet.

Next, during connection setup, the round-trip-time (RTT) of the connection is estimated, step 510. The RTT is typically not reliably measured during windowed data flow at a gateway without probe packets or routing information. Thus, the present method typically does not depend on accurate measures of RTT but rather is driven by a nominal value from the first estimate.

At any given time, the available response-data bandwidth is partitioned to all existing connections within a class proportionally. The available bandwidth is updated upon each new admitted connection (SYN or SYN&DATA) and each terminated connection (FIN). If there are guaranteed rates for each connection, the system may disallow new connections during request-data phase or allow new connections as a best-effort class.

The source is then allowed to ramp up the source flow according to application requirements and TCP flow control, step 520. This flow is monitored by monitoring ACKs flowing in the return direction. During this phase, the system also estimates the bottleneck link speed for the connection. As a result, the minimum inter-ACK, back-to-back ACKs, or inter-data packet time observed is determined, step 530, which gives a lower bound on link speed. This speed is typically used to adjust and reallocate source bandwidth among sibling connections preferably if the available rate is greater than the link speed.

In a preferred embodiment, on each data ACK, the available response bandwidth and actual utilization over the life of the connection is translated into a limit window size for the next RTT, step 540. In an alternative embodiment, fair queuing at all leaf nodes and the use limiting queue lengths are used to calculate window sizes. A limit window increase is scaled to a multiple of the segment size to emulate receiver silly-window avoidance.

If the connection ramps above the assigned source flow (or the emulated fair queue grows too large), step 550, the window sizes are preferably modified with each response ACK as follows, step 560:

If(wsender>wmax){w=MAX(wmax,MSS); if(a+w<eprev){w= eprev-a}else{eprev=e}; send-ack(a,w)}

Where MSS=Max. segment size; eprev=Window right edge sequence# advertised in previous ACK; wsender=Window advertised by the sender; a=ACK sequence#; wmax= Window size limit; and w=sent window.

The above rate control method is efficient to implement, follows TCP semantics (including silly window avoidance and window updates), and "guarantees" a minimum bandwidth (MSS/RTT) to a connection without use of any timing or queuing mechanisms. The method is extendable to provide arbitrarily small bandwidth limits using a timing or queuing mechanism to send a window update preferably as follows:

If(wmax<MSS){set_tirner(RTT*MSS/wrnax)}timer: w=MSS; send_ack(a,w)

The above equations are merely exemplary, it should be understood that many variations in the above equations can be made in light of the teaching above are such variations are contemplated in alternative embodiments of the present invention. In the preferred embodiment, to compensate for the effects of TCP slow-start, a connection sends up to 25% over limit over any RTT.

Figure 6:
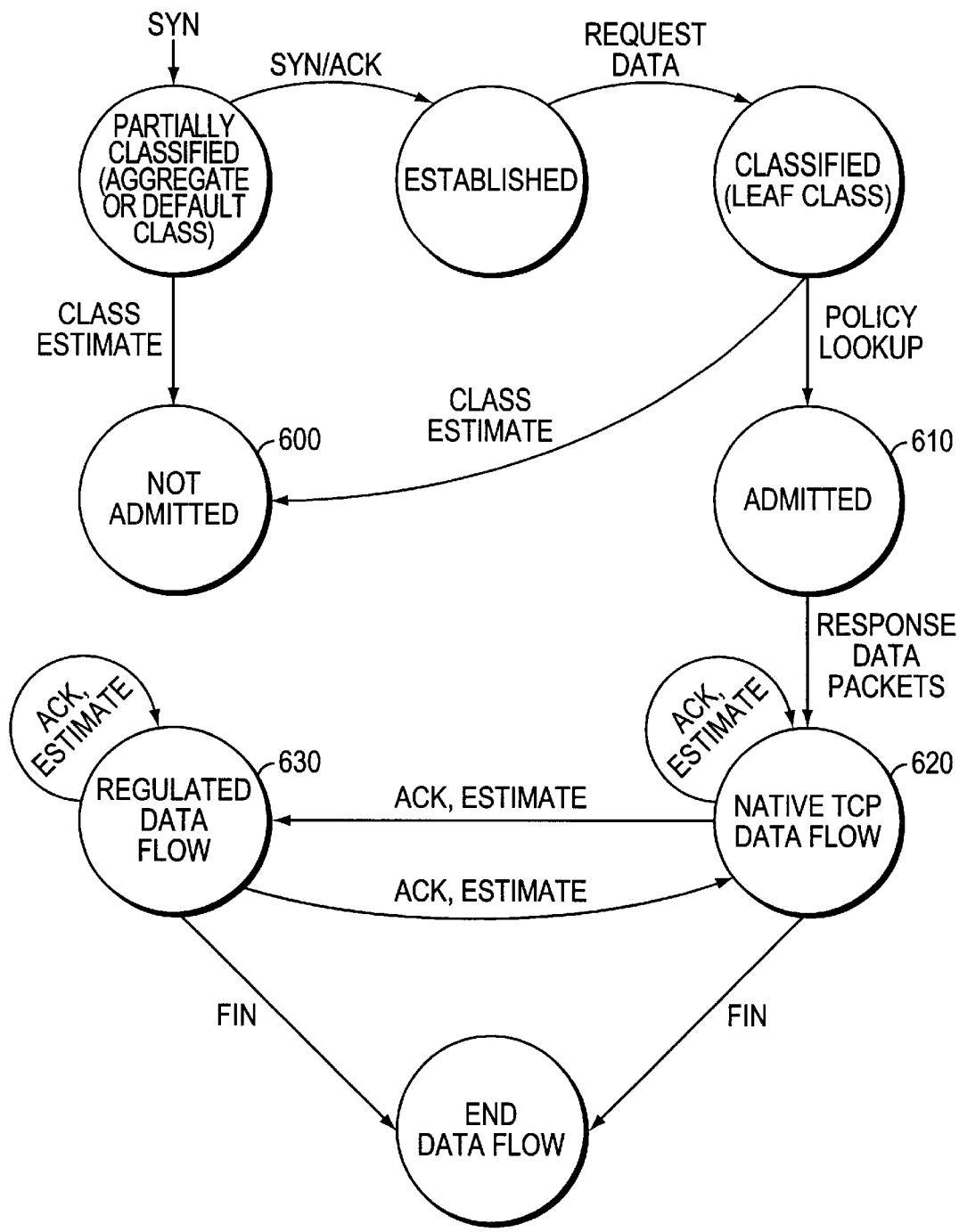
FIG. 6 illustrates a simplified state transition diagram for an embodiment of the present invention.

FIG. 6 illustrates a simplified state transition diagram for an embodiment of the present invention. FIG. 6 illustrates the role of traffic class and policy in one embodiment of the present invention. Typically, when a traffic class for a connection is not recognized, when exception conditions are in place, and other situations, a connection is not admitted, state 600. If a connection is admitted, state 610, data can then begin to flow, state 620.

FIG. 6 further illustrates how typically TCP flow is not inhibited when the round-trip-time does not exceed the flow limits, state 620, and how typical TCP flow is inhibited when the round-trip-time exceeds the flow limits, state 630. In the former case, the ACK signal is typically not inhibited, whereas in the latter case, the ACK signal is inhibited, or delayed.

Figure 7:
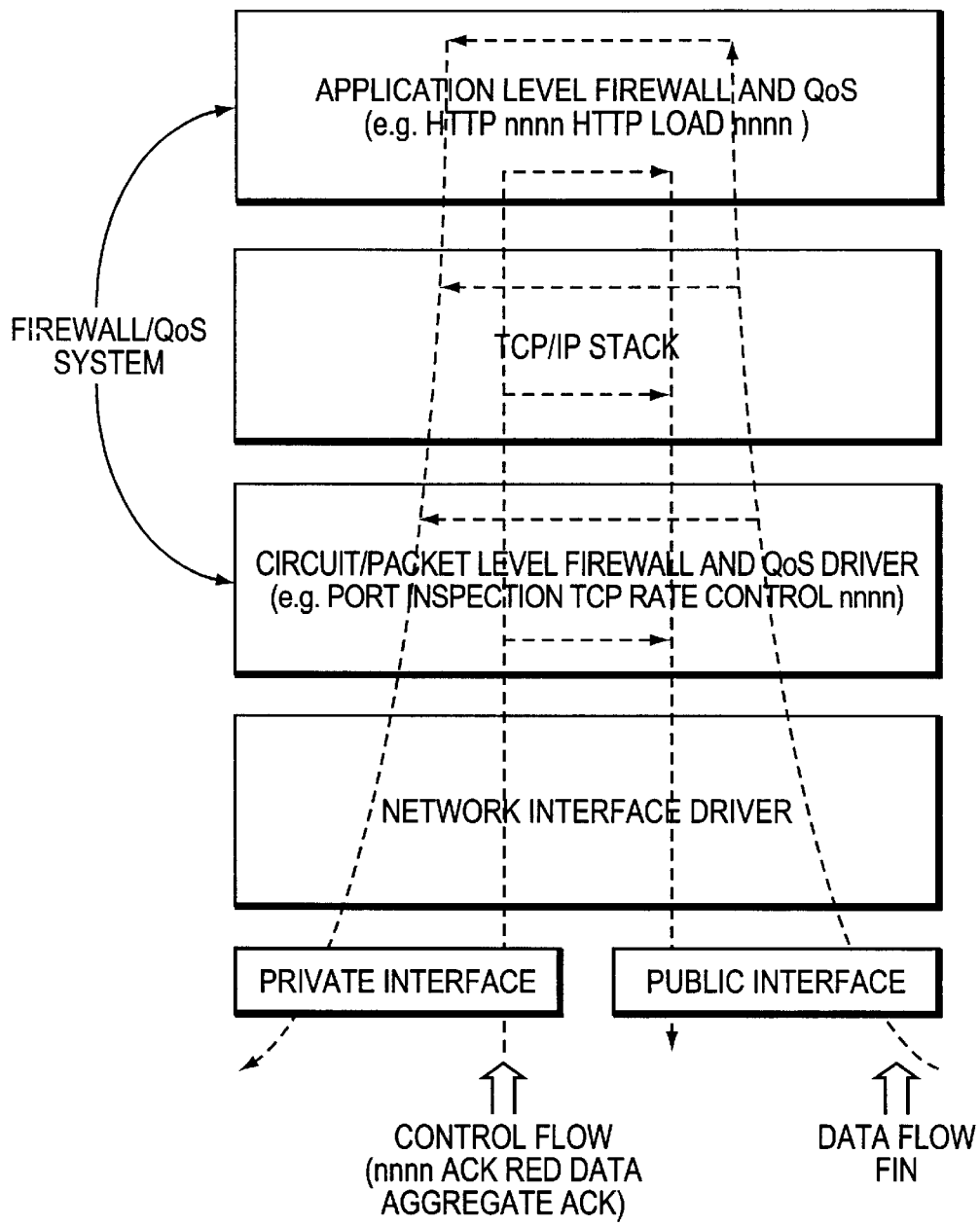
FIG. 7 illustrates an implementation architecture of an embodiment of the present invention.

FIG. 7 illustrates an implementation architecture of an embodiment of the present invention.

V. Applications

The embodiments described above are preferably used to address current and future technological changes and requirements.

For example, the embodiments of the present invention provide resource management for ever increasing traffic, i.e. scalability. Scaling refers to the growing (and often indeterminate) body of users having widely varying access speeds that compete for the same resources, for example bandwidth. Scaling is adversely affected by the growing volume of available content (e.g. HTMl pages), by the falling costs of CPUs, and trends towards network computers. By providing QoS management, as described above, management of increasingly scarce resources (bandwidth) is facilitated.

Further, the embodiments of the present invention provide resource management to respond to Business priorities. Business use of the Internet typically ranges from casual use to business critical use. As secure Internet business applications continue to develop, providing service quality for these core business functions over casual use will be a high priority (e.g., the quality of external access of a customer to an order entry web page. By providing QoS management as described above, Business-oriented or other priority traffic is facilitated.

Also the embodiments of the present invention provide resource management to respond to different traffic types. As different types of content application increase and standards continue to emerge and evolve, different types of Internet traffic may require specific service guarantee. For example, different applications may require different bandwidth, e.g. intensive, real-time, interactive, and the like. By providing QoS management as described above, bandwidth critical traffic is facilitated.

The embodiments of the present invention described above preferably provide a symmetrical, solution for gateway control of inbound and outbound traffic over the Internet, with the basic methods (queuing and source TCP rate control) designed to complement each other.

Conclusion

In the foregoing specification, the invention has been described with reference to specific exemplary embodiments thereof Many changes or modifications are readily envisioned. For example, the present invention can be applied to manage a variety of TCP/IP network traffic types for the Internet and Intranet. Further, the techniques can also be applied to Novell SPX, Xerox XNS or any protocol with a similar 'flow-control' design that utilizes windows and acknowledgment signals (similar to ACK).

Alternative embodiments of the present invention can also be applied to a 'legacy' private WAN running IP as well as native Novell protocols if there is a need. (e.g., file server and client/server traffic). Further, embodiments of the present invention can include monitoring, billing, and reporting features, thus allowing for enhanced client billing and internal cost accounting of network usage.

These techniques are preferably implemented within a firewall platform to solve the provide the following benefits: bidirectional bandwidth management of network links carrying TCP traffic; reactive (short-time scale) and proactive (long time scale) control mechanisms; and gateway (local) and end-end (global) techniques for bandwidth control. This solution reduces their contribution to congestion in the Internet; and operation in a present day heterogeneous wide area networks, such as the Internet, without requiring any client, server or router changes.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for monitoring quality of service within a network of computers, said system comprising:

a plurality of computers coupled to form an internal network of computers;

a firewall server comprising a firewall program coupled to at least one of said plurality of computers and coupled to an outgoing line to a wide area network of computers, said firewall server being configured to receive a connection request, estimate a bit rate over a round-trip-time between said at least one of said plurality of computers and the wide area network of computers, receive a receive acknowledgment signal at said at least one of said plurality of computers, delay transmission of a receive acknowledgment signal when the bit rate is greater than a bit rate limit, and transmit the receive acknowledgment signal over the outgoing line when the bit rate is not greater than the bit rate limit; and a bandwidth management tool coupled to said firewall server, said bandwidth management tool being capable of monitoring and managing incoming and outgoing information to and from said firewall server by classifying the connection request received at said firewall server into a traffic class from a plurality of traffic classes, determining a minimum bandwidth for said plurality of traffic classes, determining a maximum latency for said plurality of traffic classes, and dynamically allocating bandwidth to the connection request based on the traffic class into which the connection request is classified, said traffic class having a minimum bandwidth and/or a maximum latency, and the total traffic on the system.

2. The system of claim 1 wherein said incoming information is transmission control protocol/Internet protocol.

3. The system of claim 1 wherein said outgoing information is transmission control protocol/Intenet protocol.

4. The system of claim 1 wherein said firewall server is configured as a gateway.

5. The system of claim 1 wherein said monitoring occurs by filtering of data packet acknowledgments (ACKs).

6. The system of claim 1 wherein said monitoring occurs by invoking a transmission control protocol/Intenet protocol native source flow control.

7. The system of claim 1 wherein said system comprises a computer readable memory.

8. The system of claim 7 wherein said computer readable memory comprises said firewall program and said bandwidth management tool.

9. The system of claim 1 wherein said firewall server provides a single access point for said firewall program and said bandwidth management tool.

10. The system as recited in claim 1 wherein the connection request received by the firewall server is classified into a traffic class based on properties of the connection request, the properties selectable from a group of properties including source of the connection request, destination of the connection request, data-type of the connection request, type of the connection request, direction of the connection request, protocol used by the connection request, and characteristics of users of the connection request.

11. A method for installing a bandwidth management tool into a firewall for a network of computers, said network of computers each being coupled to each other to form a local aea network; said network of computers being coupled to a firewall server having computer memory, said firewall server being configured to receive a connection request, comprising:

estimating a bit rate over a round-trip-time between said at least one of said plurality of computers and the wide area network of computers, receive a receive acknowledgment signal at said at least one of said plurality of computers, delay transmission of a receive acknowledgment signal when the bit rate is greater than a bit rate limit, and transmit the receive acknowledgment signal over the outgoing line when the bit rate is not greater than the bit rate limit to conserve bandwidth; and, installing a bandwidth management tool into a portion of said computer memory, said bandwidth management tool being into a portion of said computer memory, said bandwidth management tool being capable of monitoring and managing incoming and outgoing information to and from said firewall server by classifying the connection request received at said firewall server by classifyring the connection request received at said firewall server into a traffic class from a plurality of traffic classes, dotennning the minimum bandwidth for said plurality of traffic classes, determining the minimum bandwidth for said plurality of traffic classes, determining the maximum latency for said plurality of traffic classes, and dynamically allocating bandwidth to the connection request based on the traffic class into which the connection request is classified, said traffic class having a minimum bandwidth and a maximum latency, and tho total traffic on the system.

12. The method of claim 11 wherein said incoming information is transmission control protocol/Internet protocol.

13. The method of claim 11 wherein said outgoing information is transmission control protocol/Internet protocol.

14. The method of claim 11 wherein said firewall server is configured as a gateway.

15. The system of claim 11 wherein said monitoring occurs by filtering of data packet acknowledgments (ACKs).

16. The system of claim 11 wherein said monitoring occurs by invoking a transmission control protocol/Internet protocol native source flow control.

17. The method of claim 11 wherein said firewall server provides a single access point for said firewall program and said bandwidth management tool.

18. The method as recited in claim 11 wherein the connection request received by the firewall server is classified into a traffic class based on properties of the connection request, the properties selectable from a group of properties including source of the connection request, destination of the connection request, data-type of the connection request, type of the connection request, direction of the connection request, protocol used by the connection request, and characteristics of users of the connection request.

19. A computer readable media having instructions written thereon for the practice of a method for installing a bandwidth management tool into a firewall for a network of computers, said network of computers each being coupled to each other to form a local area network, said network of computers being coupled to a firewall server having computer memory, said firewall server being configured to receive a connection request, comprising:

estimating a bit rate over a round-trip-time between said at least one of said plurality of computers and the wide area network of computers, receive a receive acknowledgment signal when the bit rate is greater than a bit rate limit, and transmit the receive acknowledgement signal over the outgoing line when the bit rate is not greater than the bit rate limit to conserve bandwidth; and, installing a bandwidth management tool into a portion of said computer memory, said bandwidth management tool being into a portion of said computer memory, said bandwidth management tool being capable of monitoring and managing incoming and outgoing information to and from said firewall server by classifying the connection request received at said firewall server by classifying The connection request received at said firewall server into a traffic class from a plurality of traffic classes, determining the is width for said plurality of traffic classes, determining the maximum latency for said plurality of traffic classes, and dynamically allocating bandwidth to the connection request based on the traffic class into which the connection request is classified, said traffic class having a minimum bandwidth and a maximum latency, and the total traffic on the system.

20. Electromagnetic signals propagating on a computer network, said electromagnetic signals carrying information for the practice of a method for installing a bandwidth management tool into a firewall for a network of computers, said network of computers cachl being coupled to each other to form a local area network, said network of computers being coupled to a firewall server having computer memory, said firewall server being configured to receive a connection request, comprising:

estimating a bit rate over a round-trip-time between said at least one of said plurality of computers and the wide area network of computers, receive a receive acknowledgement signal at said at least one of said plurality of computers, delay transmission of a receive acknowledgement signal when the bit rate is greater than a bit rate limit, and transmit the receive acknowledgment signal over the outgoing line when the bit rate is not greater than the bit rate limit to conserve bandwidth; and, installing a bandwidth management tool into a portion of said computer memory, said bandwidth management tool being into a portion of said computer memory, said bandwidth management tool being capable of monitoring and managing incoming and outgoing information to and from said firewall server by classiing the connection request received at said firewall server by classifying the connection request received at said firewall server into traffic class from a prlity of traffic classes, determining the minimum bandwidth for said plurality of traffic classes, determining the minimum bandwidth for said plurality of traffic classes, determining the maximum latency for said plurality of traffic classes, and dynamically allocating bandwidth to the connection request based on the traffic class into which the connection request is classified, said traffic class having a minimum bandwidth and a maximum latency, and the total traffic on the system.

* * * * *